United States Patent
Cabric

(10) Patent No.: US 8,223,889 B2
(45) Date of Patent: Jul. 17, 2012

(54) OPPORTUNISTIC RADIO FREQUENCY COMMUNICATIONS

(75) Inventor: Danijela Cabric, Los Angeles, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 837 days.

(21) Appl. No.: 12/351,697

(22) Filed: Jan. 9, 2009

(65) Prior Publication Data

US 2010/0177840 A1    Jul. 15, 2010

(51) Int. Cl.
    H04L 27/00    (2006.01)
(52) U.S. Cl. ........................................ 375/316
(58) Field of Classification Search .............. 375/259, 375/267, 299, 316, 324, 347, 349; 324/607; 341/126, 127, 128, 155, 156, 159; 379/387.02; 455/101, 132–141; 700/53
    See application file for complete search history.

(56) References Cited

U.S. PATENT DOCUMENTS

| | | | | |
|---|---|---|---|---|
| 5,952,968 | A * | 9/1999 | McDowell | 342/383 |
| 6,091,788 | A * | 7/2000 | Keskitalo et al. | 375/347 |
| 6,590,528 | B1 * | 7/2003 | DeWulf | 342/357.63 |
| 7,057,573 | B2 * | 6/2006 | Ohira | 343/817 |

OTHER PUBLICATIONS

Venkateswaran et al., Partial Beamforming to Reduce ADC Power Consumption in Antenna Array Systems, SPAWC 2008, p. 146-150.*
Danijela Cabric, Cognitive Radio Research, Berkeley Wireless Research Center Presentation, University of California At Berkeley, Jun. 1, 2006 (Approximate Date).
English Language Abstract of Japanese Patent Publication No. JP 2007-088940 A, Japanese Patent Office, Patent & Utility Model Gazzette, Patent Abstracts of Japan, (2007).
English Language Abstract of Japanese Patent Publication No. JP 2000-031723 A, Japanese Patent Office, Patent & Utility Model Gazzette, Patent Abstracts of Japan, (2000).

* cited by examiner

Primary Examiner — Sam K Ahn
(74) Attorney, Agent, or Firm — Jensen & Puntigam, PS

(57) ABSTRACT

Systems and methods for opportunistic radio frequency communications are provided which include the use of multiple antennas. Signal data from the antennas can be used to determine directions of incoming signals. Signal power in the direction of strongest signals can then be reduced by adjusting relative gains and phases of received signals. Reducing signal power of strong signals reduces the dynamic range of received signals and facilitates discovery of unused communication frequencies. Any unused frequencies can then be used or allocated as desired.

20 Claims, 11 Drawing Sheets

OPPORTUNISTIC RADIO FREQUENCY COMMUNICATIONS

BACKGROUND

With the present explosive increase in wireless communications, available unreserved radio communications frequencies are rapidly decreasing. For example, in the United States, the Federal Communications Commission (FCC) has restricted a range of radio communications channels to government or military use. Other radio communications channels are licensed for commercial use, however a great many of these are already licensed by existing commercial radio stations, cellular communications providers, television broadcasters, and so forth. A similar situation exists in many developed countries of the world.

While a particular radio communications channel may be licensed for use throughout a particular territorial jurisdiction, such as the United States, it is likely that such channel is not in fact used all of the time in every geographical part of the jurisdiction. For example, while a commercial radio station may broadcast on a licensed frequency in one or more major metropolitan areas, its radio signals may not reach more remote areas, or areas obstructed by geographical features such as mountains and large buildings. Similarly, the commercial radio station may choose not to broadcast during certain times of the day, for example in the period between midnight and four o'clock AM, when the broadcast may not reach enough listeners to justify the costs of programming.

As a result, there are radio communications frequencies that are in fact available for opportunistic use without interfering with communications transmitted by the license holder. These unused radio communications frequencies present a large untapped resource and a significant commercial opportunity for those who can devise a successful approach for discovering which unused frequencies are available at a particular time and place, and for subsequently exploiting those unused frequencies while the license holder neglects to do so.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope; the disclosure will be described with additional specificity and detail through use of the accompanying drawings:

DETAILED DESCRIPTION

Figure 1A:
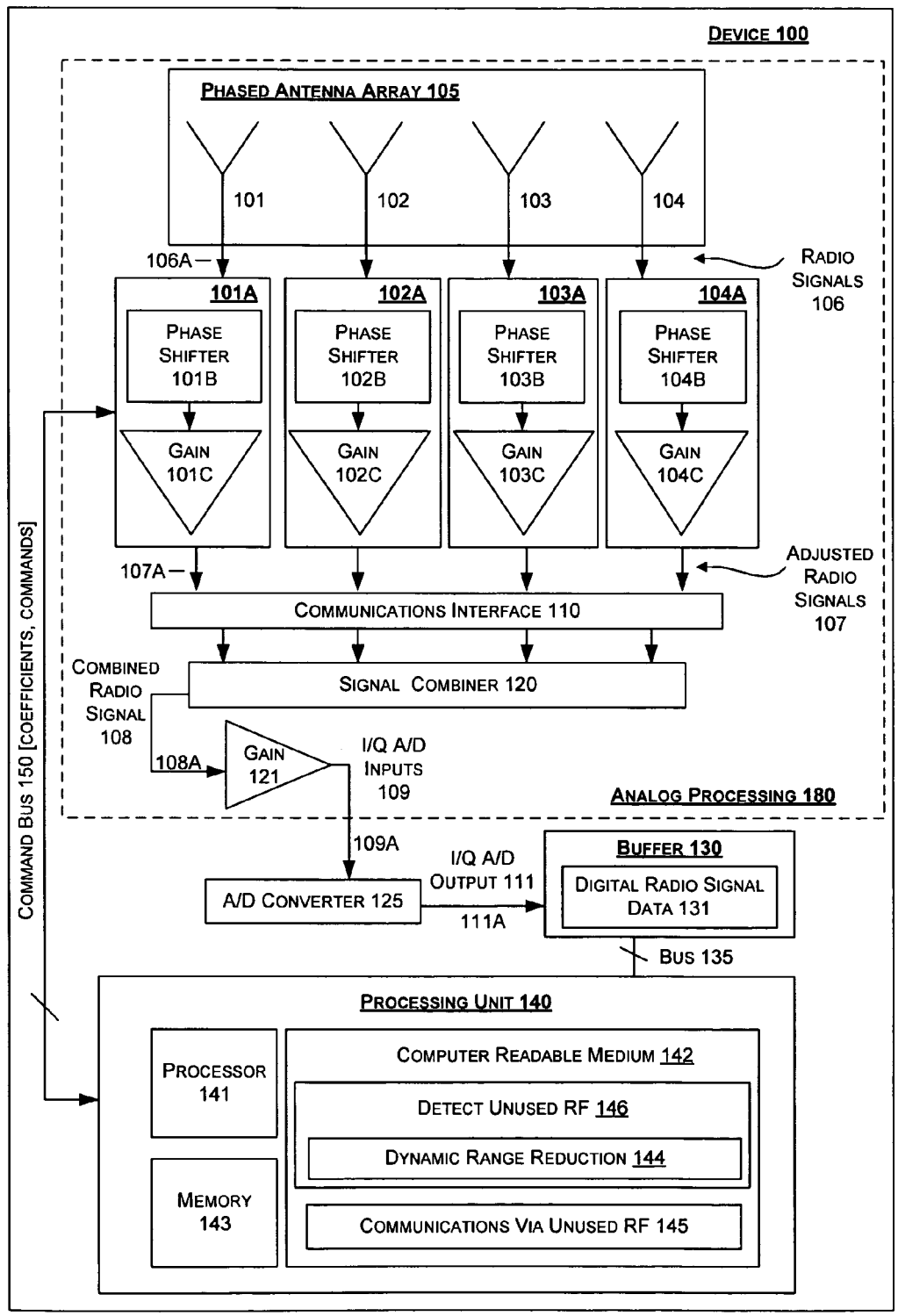
FIG. 1A illustrates an example device configured for opportunistic radio frequency communications.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A brief overview will facilitate understanding of this disclosure. In general, opportunistic radio frequency communications can be carried out by detecting radio frequencies that are not in use, and subsequently communicating on unused frequencies. In the detection step, it is advantageous to utilize a "wideband" detection approach, in which transmissions on a wide range of frequencies are analyzed. The wider the analyzed range, the more likelihood there is of finding an unused channel.

Further to the detection step, sensitivity to weak signals is useful for concluding that a particular frequency band (also referred to herein as a channel) is not in use. In the United States, for example, the FCC sets minimum signal strength for radio communications. If signal strength on a particular channel is below the FCC minimum, it is safe to conclude that the channel is not in use. A sensitive receiver is useful for establishing that signals are not in fact being transmitted at or just above such minimum signal strength.

Sensitivity to weak signals can be hampered by large differences in signal power. The range of signal powers from the weakest signal up to the strongest signal is referred to as "dynamic range". In practical systems, Radio Frequency (RF) signals arriving at a sensing antenna include signals from both close transmitters and widely separated transmitters, and often from transmitters operating at widely different power levels and channel bandwidths. As a result, large dynamic range becomes a challenge in reliable wideband spectrum sensing as it sets stringent requirements on circuits linearity and resolution of Analog to Digital (A/D) converters. The cost and power consumption of these components are in general considered prohibitively large for integration into many of today's wireless terminal devices, for example consumer electronics such as radios, personal computers, cellular telephones, televisions and so forth.

The present disclosure describes approaches for signal reception and conditioning so as to minimize the negative effects of large dynamic range, and in particular examples, the effects of strong signals and related problems such as so-called signal leakage caused by saturation, clipping or nonlinearities. Reducing strong in-band signals is one aspect of receiving and processing weak signals for spectrum sensing. When implemented, techniques provided herein allow for manufacture of wideband spectrum sensing devices with relaxed dynamic range requirements. Such devices can take advantage of opportunistic radio frequency communications without the costs imposed by needing to process signals involving large dynamic ranges.

FIG. 1A illustrates an example device 100 configured for opportunistic radio frequency communications. The device 100 illustrates an opportunistic radio frequency communication device that can employ wideband spectrum sensing as will be described. Device 100 may comprise a variety of components, which are discussed in detail below. While all of the components shown inside device 100 in FIG. 1A may be included in the device 100, it should be emphasized that certain components may be provided by one or more external devices in communication with device 100. In particular, the phased antenna array 105, phase shifters/gain units 101A-104A, signal combiner 120, gain unit 121, and/or analog to digital (A/D) converter 125 may be advantageously disposed external to the device 100 in some embodiments. Also, the functions of one or more components could be combined together or separated into additional components as may be desired in a particular implementation. For simplicity, an example including all of the components of device 100 is first introduced herein, and variations and other configurations are briefly discussed thereafter.

As illustrated in FIG. 1A, device 100 may include an analog processing block 180 comprising a phased antenna array 105, a plurality of phase shifters/gain units 101A, 102A, 103A, and 104A, a communications interface 110, a signal combiner 120, and a master gain unit 121. Device 100 may further include an A/D converter 125, a buffer 130, and a processing unit 140.

The phased antenna array 105 may include a plurality of antennas 101, 102, 103, and 104. Each antenna 101-104 may connect to a corresponding phase shifter/gain unit 101A-104A. Each phase shifter/gain unit 101A-104A may include a phase shifter 101B, 102B, 103B, or 104C, respectively, and a gain unit 101C, 102C, 103C, or 104C, respectively.

The processing unit 140 may include one or more processors 141, memory 143, and computer readable medium 142. Computer readable medium 142 may include instructions for detecting unused RF frequencies 146, and instructions for communications via unused RF frequencies 145. Instructions for detecting unused RF frequencies 146 may include dynamic range reduction instructions 144 which are discussed in greater detail below.

FIG. 1A illustrates a variety of couplings between the above specified elements. In general, the couplings may include for example first wired or wireless interfaces coupled to a first component, and second wired or wireless interfaces coupled to a second component. Appropriate wiring, cabling, or wireless transmissions carry signals between the first and second interfaces.

Each antenna 101-104 in the phased antenna array 105 may be coupled to a corresponding phase shifter/gain unit 101A-104A via couplings 106A. Within the phase shifter/gain units 101A-104A, a phase shifter 101B-104B may be coupled to a gain unit 101C-101D. The phase shifter/gain units 101A-104A may be coupled to a communications interface 110 via couplings 107A. The communications interface 110 may be coupled to the signal combiner 120. The signal combiner 120 may be coupled to the master gain unit 121 via combined radio signal coupling 108A. The master gain unit 121 may be coupled to the A/D converter 125 via A/D input coupling 109A. The A/D converter 125 may be coupled to the buffer 130 via I/Q A/D output coupling 111A. The buffer 130 may be coupled to the processing unit 140 via bus 135. Elements inside the processing unit 140 may be coupled to one another via one or more additional internal buses, as will be discussed in greater detail below. Finally, the processing unit 140 may be coupled via a command bus 150 to elements such as the phase shifter/gain units 101A-104A.

Device 100 may include a phased antenna array 105 including a plurality of antennas 101, 102, 103, and 104. Antennas 101-104 are configured to receive radio signals that carry radio signal data. Radio signals 106 may be communicated from antennas 101-104 to corresponding phase shifter/gain units 101A-104A. These units 101A-104A are configured to adjust the received radio signals according to coefficients and/or commands received from the processing unit 140 via the command bus 150. However, absent adjustment instructions, the units 101A-104A can pass the radio signals through unadjusted, or perform a standard default adjustment.

The phase shifter/gain units 101A-104A may accomplish signal phase shifting and gain adjustment using phase shifting/gain adjustment electronics internal to the components 101B-104B, and 101C-104C, respectively, or may accomplish this by sending control commands and/or phase shift coefficients to appropriate components disposed at each antenna 101-104. Alternatively, the processing unit 140 may send phase shift coefficients and/or commands directly to such components disposed at each antenna 101-104.

The phase shifter/gain units 101A-104A may utilize antenna array coefficients to adjust the relative amplitude and phases of signals received from antennas 101-104. The antenna array coefficients may be initially calculated by the processing unit 140 and sent from the processing unit 140 to the phase shifter/gain units 101A-104A. In some embodiments, one antenna array coefficient is assigned to each antenna 101-104. Coefficients can be selected in a manner that when adjusted radio signals 107 are combined by the signal combiner 120 to provide a combined radio signal 108, the combined radio signal 108 comprises a reduced radio signal power from a particular direction. As will be shown, this direction can be selected to be the direction of one or more strongest received signals, thereby reducing the dynamic range of the combined radio signal 108 from the signal combiner 120.

Communications interface 110 may be included in some examples. Interface 110 may comprise electrical connectors for wires coupled to each phase shifter/gain unit 101A-104A (e.g., each unit 101A-104A being separately coupled to communications interface 110). An electrical connector is a conductive device for joining electrical circuits together. The connection may be temporary, as for portable equipment, or may require a tool for assembly and removal, or may be a permanent electrical joint between two wires or devices. In computing, an electrical connector can also be known as a physical interface. Connectors may join two lengths of flexible wire or cable, or may couple a wire or cable to an electrical terminal. These and other structures allow the components of FIG. 1A to communicate with units 101A-104A and corresponding antennas 101-104 of the array 105.

The signal combiner 120 is configured to combine the signals from the various antennas 101-104 of the phased antenna array 105 as adjusted by the phase shifter/gain units 101A-104A. The combined radio signal 108 that is output from the signal combiner 120 may next be passed to an analog master gain unit 121. The master gain unit 121 may apply a gain to the combined radio signal 108 as necessary to bring them into the optimal dynamic range of the A/D converter 125.

The input 109 to the A/D converter 125 may comprise in-phase (I) and quadrature (Q) components. Separation of received radio signals can be performed by the device 100 using techniques such as those illustrated in FIGS. 1B, 1C, and 1D.

In general, regarding separating signals into I and Q components, received radio signals may be processed by a variety of electronics as will be appreciated by those of skill in the art. For example, antenna tuning and frequency down-conversion electronics can be arranged to alter received frequencies from broadcast frequencies to Intermediate Frequencies (IF) or baseband frequencies. It will be appreciated by those of skill in the art that radio signals 106 can be complex signals including both a rotational phase and a magnitude. In many systems, the complex signals are downconverted into IF signals that may include in-phase (I) and quadrature (Q) signal components. In order to carry these different radio signal components, the illustrated connection 109 to the A/D converter 125 may include three or four wires to carry the I and Q signals. In some examples, the I and Q signals can be single-ended signals such as I, GND and Q, GND that are carried by either four wires, or three wires if the grounds (GND) are combined. In other examples, the I and Q signals can be fully differential signals such as +I, −I and +Q, −Q, where a pair of wires are used to carry each differential signal, thus employing four wires to carry the signals.

The separation of signals 106 into I and Q signal components can occur at any point in the signal processing flow illustrated in FIG. 1A, up to the point where inputs 109 are passed into the A/D converter 125. In some embodiments, the separation into I and Q signal components is accomplished at the phase shifter/gain units 101A-104A.

Figure 1B:
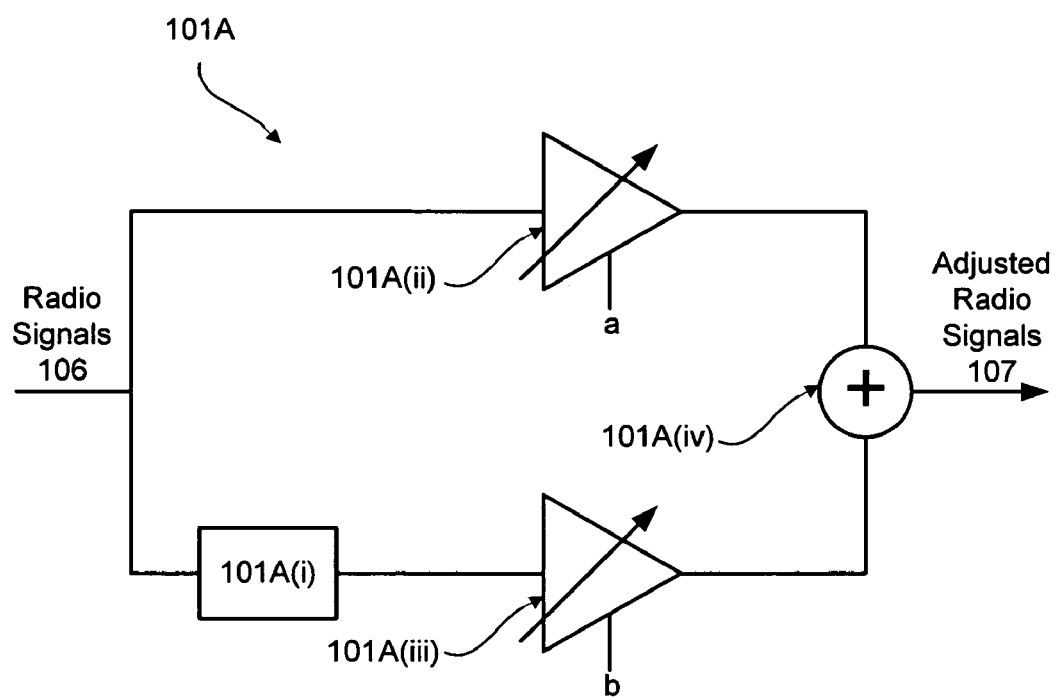
FIG. 1B illustrates one example implementation of a phase shifter/gain unit 101A.

FIG. 1B illustrates one example implementation of a phase shifter/gain unit 101A. As illustrated, phase shifter/gain unit 101A includes a phase shifter 101A(i), variable gain amplifiers 101A(ii) and 101A(iii) and a signal combiner 101A(iv). Radio signals 106 are coupled to an input of the phase shifter/gain unit 101A, for example as x(t). Phase shifter 101A(i) is configured to receive the radio signals 106 and provide a rotational phase change, which may for example correspond to a rotational phase change of signal x(t) by 90 degrees. Variable gain amplifiers 101A(ii) and 101A(iii) are variable gain amplifiers each with a corresponding gain setting. The gain settings for variable gain amplifiers 101A(ii) and 101A(iii) can be set by gain coefficients "a" and "b", as may be input for example from processing unit 140 in FIG. 1A. Signal combiner 101A(iv) is a signal combiner that is configured to combine the outputs of the variable gain amplifiers 101A(ii) and 101A(iii) as adjusted radio signals 107. In one embodiment, the adjusted radio signals 107 may be proportional to x(t)(a+jb) where j is sqrt(−1). So, effectively ax(t) can be treated as the in-phase component I and bx(t) can be treated as quadrature component Q of the signal 107.

Figure 1C:
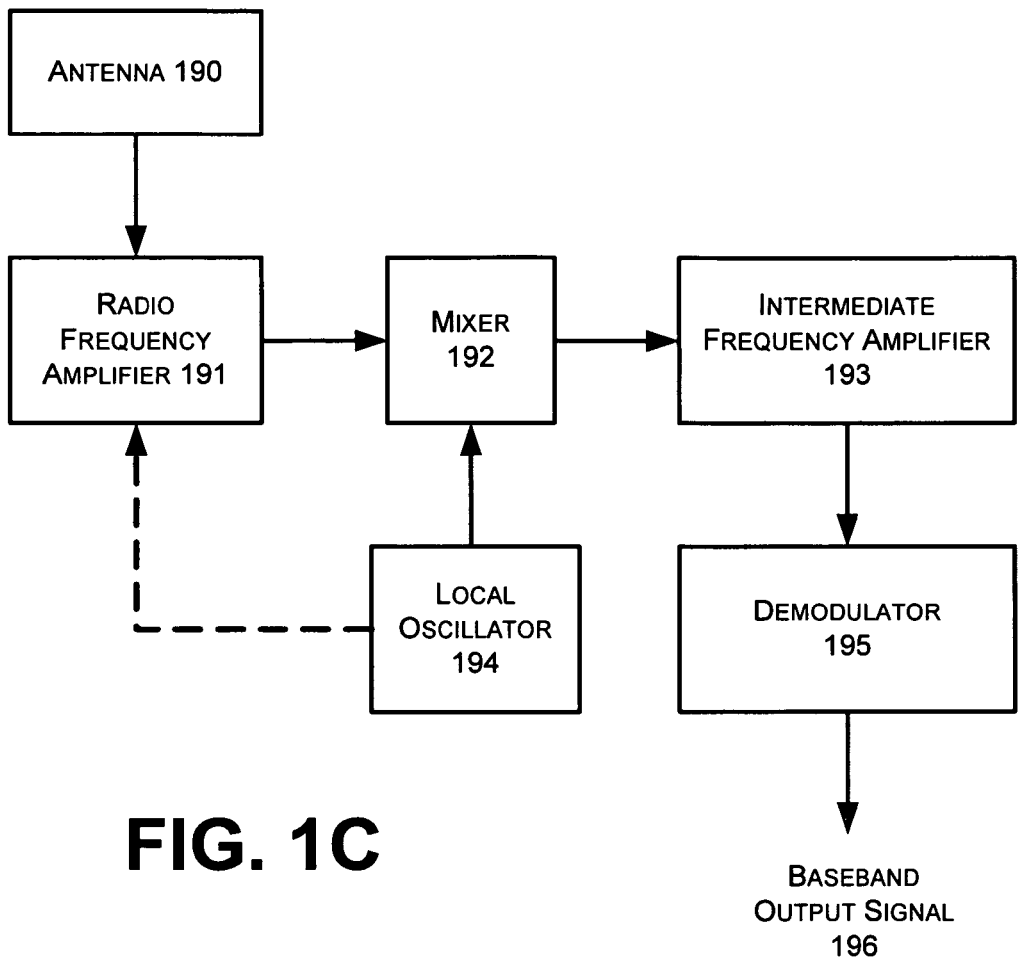
FIG. 1C illustrates a basic RF super-heterodyne receiver.
Figure 1D:
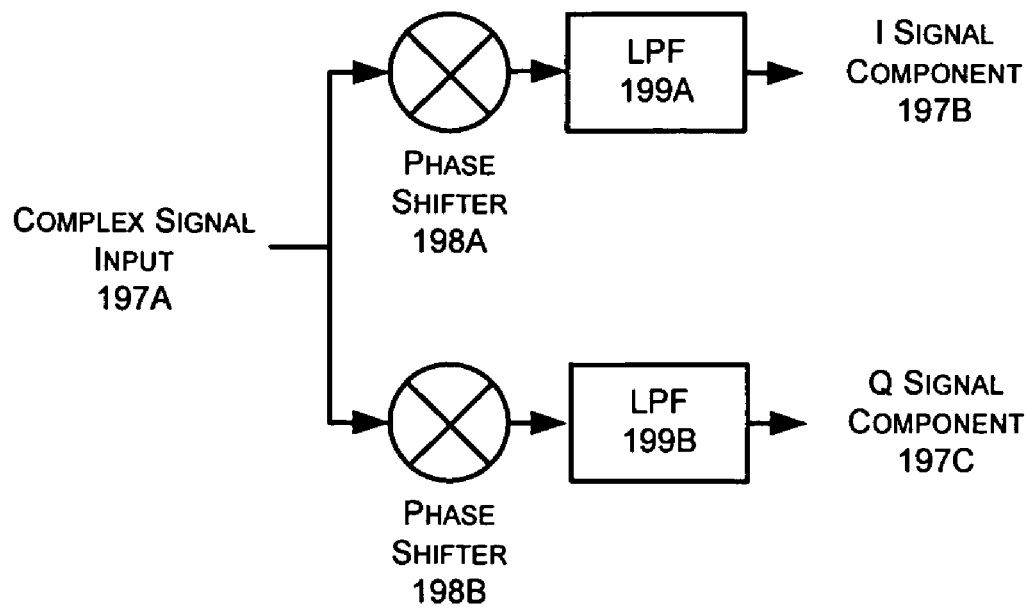
FIG. 1D illustrates an example of quadrature downconversion, which is typically found in Frequency Modulated (FM) and Pulse Modulated (PM) systems.

FIG. 1C and FIG. 1D illustrate very generally alternative configurations for demodulation and downconversion. FIG. 1C illustrates a basic RF super-heterodyne receiver. The illustrated receiver includes an antenna 190, a radio frequency (RF) amplifier 191, a mixer 192, an intermediate frequency (IF) amplifier 193, a local oscillator 194 and a demodulator 195. The antenna 190 and the RF amplifier 191 generate a radio frequency (RF) signal such as $a(t) \cdot \cos(\omega_c t)$, where a(t) corresponds to a modulated signal and w corresponds to a carrier frequency in radians. The local oscillator 194 is used to generate an oscillator signal for the mixer 192 and/or the radio frequency amplifier 191. The mixer 192 receivers the RF signal from the RF amplifier 191 and multiplies it with the local oscillator signal to convert the RF signal power from one frequency to another using a trigonometric expansion principal. For example, if the local oscillator 194 is tuned to a frequency of $\omega_{LO} = \omega_c + \omega_{IF}$, then the local oscillator 194 can be expressed as $b(t) \cdot \cos([\omega_c + \omega_{IF}] \cdot t)$. The mixer 192 then multiplies the local oscillator signal times the RF signal, yielding:

$$a(t) \cdot \cos(\omega_c \cdot t) \cdot b(t) \cdot \cos([\omega_c + \omega_{IF}] \cdot t)$$

using the trigonometric identity that $\cos(A) \cdot \cos(B) = \cos(A-B) + \cos(A+B)$, yields:

$$a(t) \cdot b(t)/2 \cdot [\cos((2\omega_c + \omega_{IF}) \cdot t) + \cos(\omega_{IF} \cdot t)].$$

The Intermediate Frequency (IF) amplifier 193 will typically include a low pass filter, blocking out the high frequency terms $(\cos((2\omega_c + \omega_{IF}) \cdot t))$ and passing the low frequency terms $(\cos(\omega_{IF} \cdot t))$, which corresponds to the intermediate frequency (IF) signals $a(t) \cdot b(t)/2 \cdot \cos(\omega_{IF} \cdot t) \cdot a(t)b(t)$. The IF signals are then demodulated by demodulator 195 to extract the baseband output signal 196.

FIG. 1D illustrates an example of quadrature downconversion, which is typically found in Frequency Modulated (FM) and Pulse Modulated (PM) systems. A complex signal input 197A can be coupled to a pair of phase shifters 198A and 198B. The phase shifters may apply a sine or cosine based phase shifter operation that changes the rotational phase of the received signal. The phase shifted signal can be filtered, for example by low pass filters 199A and 199B, yielding an in-phase signal component (I) 197B and a quadrature signal component (Q) 197C.

Returning to FIG. 1A, in embodiments where radio signals are separated into I and Q components prior to processing by the signal combiner 120, I and Q components may be combined separately, such that two separate combined radio signals 108 are utilized, one for the combined I signals and one for the combined Q signal components. As part of the combining, the signal combiner 120 can in some examples perform supplemental phase shifting/gain adjustment of received radio signals—and if so may also be coupled to the command bus 150 and configured to receive the adjustment control signals therefrom.

The A/D inputs 109 may comprise two separate inputs for I and Q signal components, using for example three or four wires as described above. A/D converter 125 may comprise a dual channel A/D converter for separately converting I and Q signals, or two separate A/D converters that are synchronously operated. The A/D converter 125 translates the radio signal data (e.g., I and Q signals) from analog form to digital form (e.g., digital signals $I_D$ and $Q_D$). The digital radio signal data ($I_D$ and $Q_D$) may next be passed to buffer 130 via I/Q A/D output 111. Output 111 may comprise two separate outputs, one for $I_D$ and one for $Q_D$. Alternatively, A/D converter 125 may have two inputs and a single output that alternates between providing the digital radio signal data $I_D$ and $Q_D$ as the output.

Digital signals $I_D$ and $Q_D$ can be recorded to a memory such as buffer 130 for further processing by processing unit 140. Since in-phase ($I_D$) and quadrature ($Q_D$) data can be stored, separate buffers may be used for the in-phase ($I_D$) and quadrature ($Q_D$) portion of the data in some implementations.

Processing unit 140 may read, write, and reset data in the buffer 130 via bus 135. Processing unit 140 may incorporate aspects of a computer as illustrated in FIG. 1B. In general, the processing unit 140 can perform operations using either or both of digital signals $I_D$ and $Q_D$. This data is referred to herein as radio signal data.

Figure 1E:
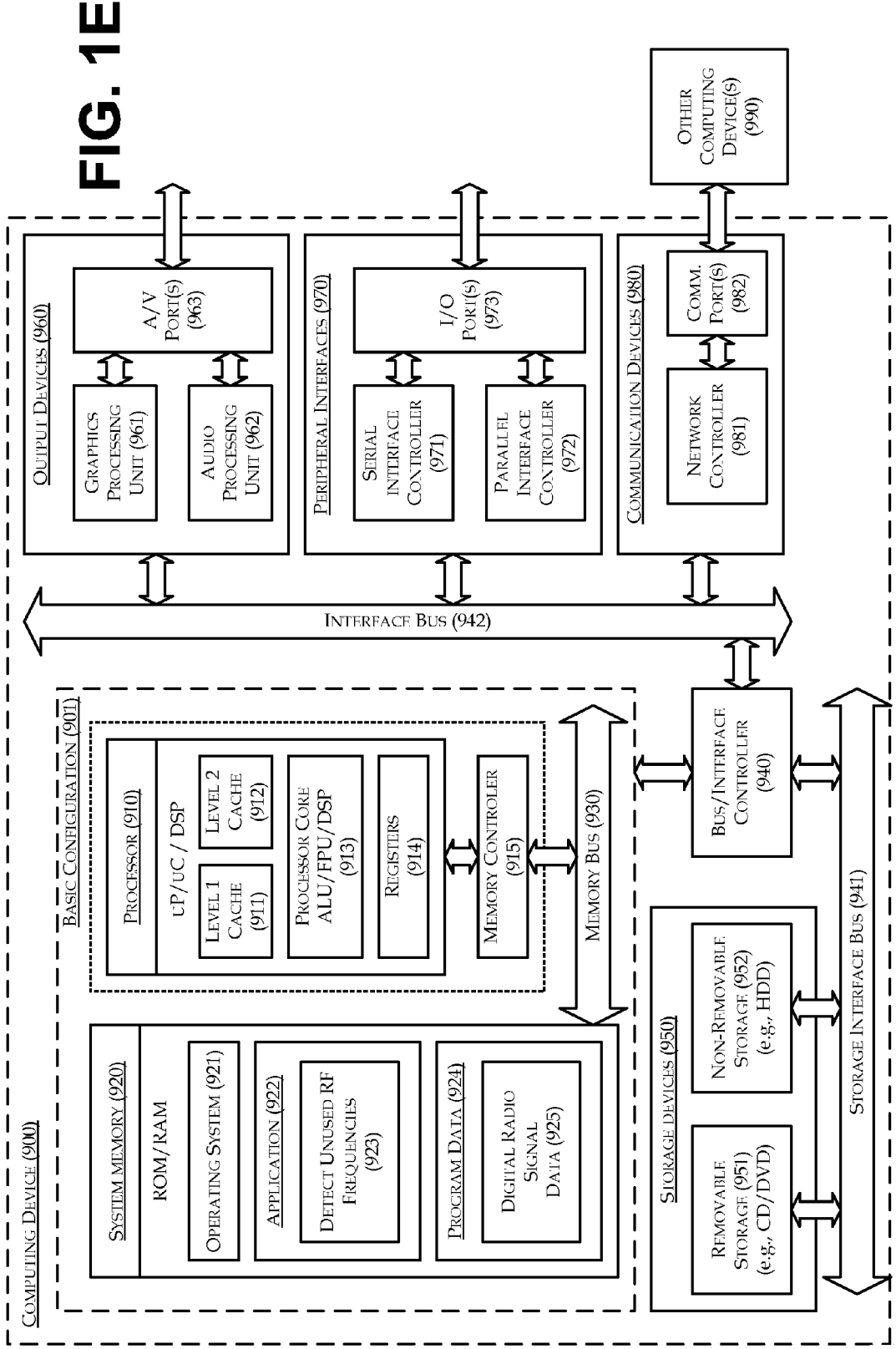
FIG. 1E illustrates an example computing device configured for opportunistic radio frequency communications.

FIG. 1E illustrates an example computing device configured for opportunistic radio frequency communications. FIG. 1E is a block diagram illustrating an example computing device 900 that may implement the processing unit 140 in accordance with the present disclosure. In a very basic configuration 901, computing device 900 typically includes one or more processors 910 and system memory 920. A memory bus 930 can be used for communicating between the processor 910 and the system memory 920. In one example, the processor 910 may correspond to processor 141, the system memory 920 may corresponds to memory 143, computer readable medium 142, and buffer 130 in FIG. 1A, and memory bus 930 may correspond to bus 135 in FIG. 1A.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a "detect unused RF frequencies" processing algorithm 923 that is arranged to perform dynamic range reduction and spatial filtering operations set forth herein. Program Data 924 includes digital radio signal data 925 that is used by processing algorithm 923, as will be further described below.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

Returning now to FIG. 1A, processing unit 140 may comprise a processor 141, memory 143, and computer readable medium 142 such as a hard disk or flash memory. The processor 141 may load and execute instructions from computer readable medium 142. As illustrated in FIG. 1A, such instructions may include instructions for detecting unused RF 146, which may include dynamic range reduction instructions 144 as well as a variety of other instructions as will be discussed, and instructions for communicating via a detected unused RF 145.

Instructions for communicating via detected unused RF 145 may take a variety of forms. For example, in some embodiments where device 100 will communicate with other devices via a determined radio frequency, or enable communications between other devices, instructions 145 may take the form of instructions for producing and sending a broadcast or unicast message to one or more other devices instructing the other devices to utilize the determined frequency. Such instructions may include instructions for transmitting a communication to one or more remote devices, the communication instructing the remote devices to utilize the unused radio frequency. Instructions 145 may also take the form of instructions for setting a frequency for subsequent listening and/or transmitting by device 100 itself. For example, if it is determined that a radio frequency of X Gigahertz (GHz) is unused, instructions 145 may set a device transmitter, e.g., one of the antennas 101-104, to utilize the X GHz channel for subsequent communication.

Figure 1F:
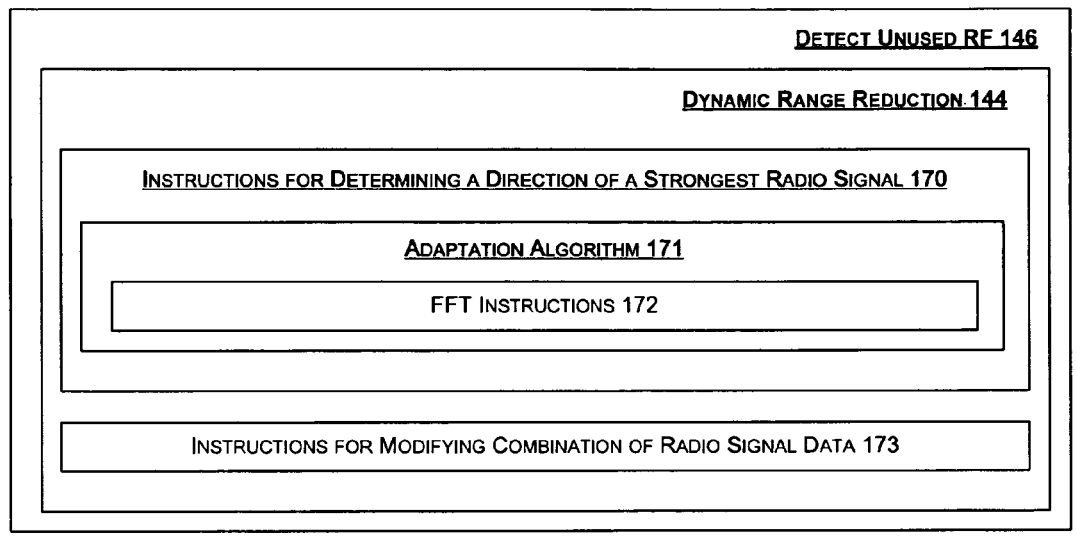
FIG. 1F illustrates a component for detecting unused RF frequencies as may be recorded on a computer readable medium.

Instructions for detecting unused RF 146 may include dynamic range reduction instructions 144. In some embodiments, these include instructions as illustrated in FIG. 1F. FIG. 1F illustrates a component for detecting unused RF frequencies as may be recorded on a computer readable medium. This may include instructions for determining a direction of a strongest radio signal 170 represented in the radio signal data, e.g., the radio signal data recorded to buffer 130, and instructions for modifying combination of radio signal data 171 received via the phased antenna array 105 to produce a combined output with a reduced radio signal power from the determined direction(s). This approach can be referred to as "spatial filtering" as it reduces dynamic range by filtering strong signals in a manner that at least partly accounts for a direction in space in which those strong signals are coming from.

Spatial filtering is advantageous at least in part because the narrowband character of strong blocking signals and their confined distribution across the spatial dimension allows their selective suppression. Device 100 may include a wideband RF front-end which is enhanced with a phased antenna array 105, as illustrated, which allows device 100 to determine and account for a direction of incoming signals, to perform a spatial filtering operation.

In some embodiments, instructions for determining a direction of a strongest radio signal 170 represented in the radio signal data can include instructions that perform an adaption algorithm 171 that exploits the fact that strong primary users occupy distinct frequency bands and spatial directions of arrival. For example, by applying FFT instructions 172 that perform a Fast Fourier Transform (FFT) on a wideband signal at the output of the A/D converter 125, a power profile in the frequency domain can be generated. In some embodiments, it may be useful to implement the FFT operation using hardware instead of software, for example using one or more Field Programmable Gate Arrays (FPGAs) and/or Application Specific Integrated Circuits (ASICs) disposed between A/D converter 125 and processing unit 140. Such modifications to the architecture illustrated in FIG. 1A will be recognized as feasible and potentially worthwhile by those of skill in the art. In other embodiments, the FFT can be implemented by the processing unit 140 as shown.

In order to obtain an estimate of angles of arrival, antenna array coefficients can be produced for example by instructions 170 in succession in a manner that samples a set of directions. Given M antenna elements, a set of K>M independent array coefficients is sufficient to obtain the estimation of spatial distribution though the least square estimation.

Once a direction of a strongest radio signal is determined, instructions for modifying combination of radio signal data 173 can be applied. These instructions 173 solve for optimal coefficients that provide dynamic range reduction. The adaption algorithm 171 can select M strongest signals in the frequency domain and then solve the linear constraint equation to meet a desired dynamic range reduction. For example, using a four element phased antenna array with five bits precision in coefficients, it is possible to reduce received signal dynamic range by approximately 25-30 decibels (dB). In one example, the dynamic range improvement effectively reduces the required resolution of the sensing radio A/D converter 125 by about four bits of resolution. As a result, a wideband spectrum sensing radio device 100 can be implemented using a commercially feasible and low power high speed A/D converter.

The instructions 173 may next send determined antenna array coefficients and/or commands to the phase shifter/gain units 101A-104A. These coefficients or commands are used to modify the radio signals so that when combined, a combined radio signal 108 is produced with a reduced radio signal power from the determined direction(s).

The device 100 architecture illustrated in FIG. 1A can thus be designed to utilize a phased antenna 105 array where antenna array coefficients are computed in the digital back-end processing unit 140, and fed back to phase shifter/gain units 101A-104A, which then are utilized to adjust the gains and/or phases of incoming radio signals. In some examples, the use of simple phase shifters in units 101A-104A is particularly attractive due to their very low latency needed for fast convergence of the desired array response.

Also, in contrast to digital beamforming receivers, some implementations can utilize multiple antenna signal processing blocks such that signal processing is advantageously done in the analog domain, before amplifiers, mixers and automatic gain control circuits. In such examples, wideband signals can be properly amplified with minimum distortion and the maximum utilization of the dynamic range (i.e., the total number of bits) in the A/D converter 125 can be achieved. In contrast to digital beamforming techniques that use parallel front-end chains and A/D converters to implement a multiple antenna receiver, the present disclosure proposes that the combining stage in the system can occur at the antenna stage so that as few as one receiver branch and one A/D converter 125 can be utilized in some example systems.

Turning now to various alternative embodiments, it will be appreciated that a device 100, especially if mobile in nature, may be moving and rotating in space so as to make computing antenna array coefficients more difficult. With an accelerometer and enough processing power, coefficients can be computed to dynamically account for the changing position of the antennas 101-104 in space, by continually adjusting coefficients to account for changing antenna orientation. Alternatively, the device 100 can wait until device 100 is stationary for determination of an available unused RF frequency. Once the determination phase is complete, the device 100 can begin communicating on the determined RF frequency, and need not perform further spatial filtering.

In some embodiments, antennas 101-104 and optionally the phase shifter/gain units 101A-104A, signal combiner 120, and A/D converter 125 may be stationed in a fixed location that communicates with device via wired or wireless link. Device 100 comprising processing unit 140 and optionally buffer 130 (but in this example not the other illustrated device components) may establish a first "normal" communication with a remote device, for example via a wired or wireless network communications link. The remote device is communicatively coupled to antennas 101-104 and optionally also to the phase shifter/gain units 101A-104A, signal combiner 120, and A/D converter 125. The remote device transmits data from antennas to device 100, which than determines an unused RF frequency to be used by the remote device when such remote device is transmitting communications on behalf of device 100. Other variations and embodiments will be apparent to those of skill in the art with the benefit of this disclosure.

Figure 2:
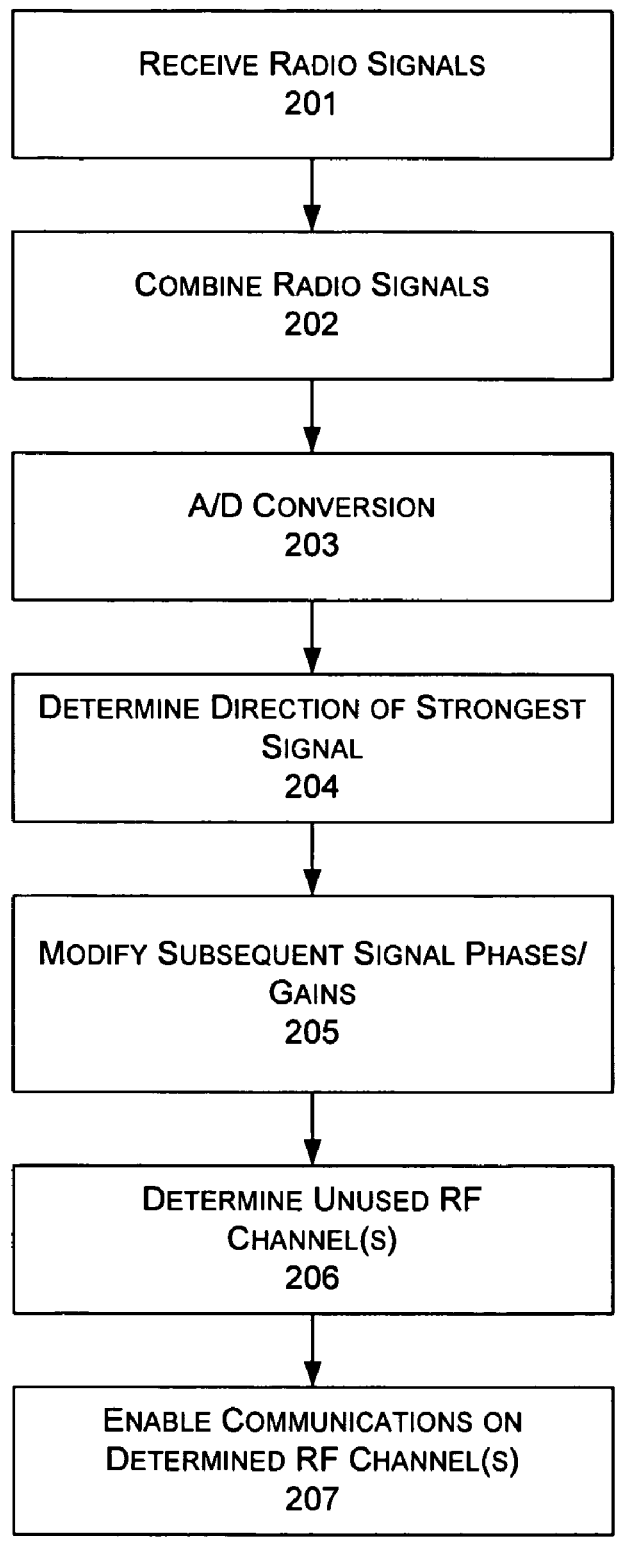
FIG. 2 illustrates an example method as may be performed by a device such as that illustrated in FIG. 1A.

Turning now to FIG. 2, an example method is provided as may be performed by a device such as that illustrated in FIG. 1A. The method illustrated in FIG. 2 reduces a dynamic range of radio signal data that may be received at a wideband sensing radio communications device. The method comprises blocks 201-207.

Two or more radio signals are received at block 201 (Receive Radio Signals). The radio signals may be received from a phased antenna array, e.g. 105 in FIG. 1A, the phased antenna array comprising at least two antennas such as 101-104 in FIG. 1A. The radio signals need not be received directly from the array. Such data may be passed through a number of devices such as signal switchers, signal buffers, signal amplifiers, signal routers, phase shifter/gain units 101A-104A, and other communications equipment along the way. In FIG. 1A, for example, the radio signals pass through the phase shifter/gain units 101A-104A and communications interface 110.

Once received, the radio signals received from two or more antennas may be initially combined at block 202 (Combine Radio Signals). For example, all the received signals may be added together without substantial phase modifications or gain adjustments to any one signal. This can be done for example by a signal combiner 120 as illustrated in FIG. 1A. The combined signal may subsequently be converted from an analog domain into a digital domain at block 203 (A/D Conversion), such as by A/D Converter 125.

A direction of a strongest radio signal represented in the initially combined radio signal data may next be determined at block 204 (Determine Direction of Strongest Signal). This may be done for example by an appropriately configured processing unit 140 as illustrated in FIG. 1A. The determination may comprise applying a Fast Fourier Transform (FFT) on the radio signal data to produce a power profile of the radio signal data, as set forth above. A set of directions can be then sampled using a sample set of antenna array coefficients. The sample set may comprise antenna array coefficients for use in analyzing a representative set of directions to determine signal strength in the representative set of directions. The representative set of coefficients should ideally sample a more or less evenly distributed set of directions across all 360 degrees of possible incoming directions. However, some examples may advantageously conduct additional sampling in particular directions of interest. The sampling coefficients may be predetermined and reused for all such determinations, or may be generated dynamically as needs dictate. For example, if the power profile indicates strong signals in many directions, a larger sample set may be needed in order to get better information about the directions of all incoming strong signals.

Subsequent radio signal phases and gains can be modified at block 205 (Modify Subsequent Signal Phases/Gains) to reduce signal power from the determined direction(s) of strong signal(s). This may be done by processing unit 140 in FIG. 1A in combination with phase shifter/gain units 101A-104A. Processing unit 140 for example computes and provides a set of antenna array coefficients to phase shifter/gain units 101A-104A for use in subsequent combination of radio signals from the two or more antennas. The phase shifter/gain units 101A-104A apply the antenna array coefficients to subsequently received radio signals. When combined, the phase/gain adjusted radio signals produce a combined output with a reduced radio signal power from the direction(s) of the strong signal(s).

Once dynamic range reduction is accomplished through the above blocks 201-205 of FIG. 2, blocks 206 and 207 may be utilized to enable communication on unused RF frequencies without the expense and complexity associated with large dynamic range, by determining unused RF channels at block 206 (Determine Unused RF Channels), and then enabling opportunistic communications any identified RF channels that are unused at block 207 (Enable Communications on Determined RF Channels). Enabling opportunistic communications on determined unused RF channels may include for example the operations performed by instructions 145 illustrated in FIG. 1A.

A number of techniques are available for use in determining unused RF channels at block 206, any of which may be employed. In some embodiments, instructions 146 in FIG. 1A may cause processing unit 140 to iterate through a series of bands that display low communications activity as determined through the wideband sensing phase. Any bands that can be confirmed to be unused may be candidates for subsequent communications.

Figure 3:
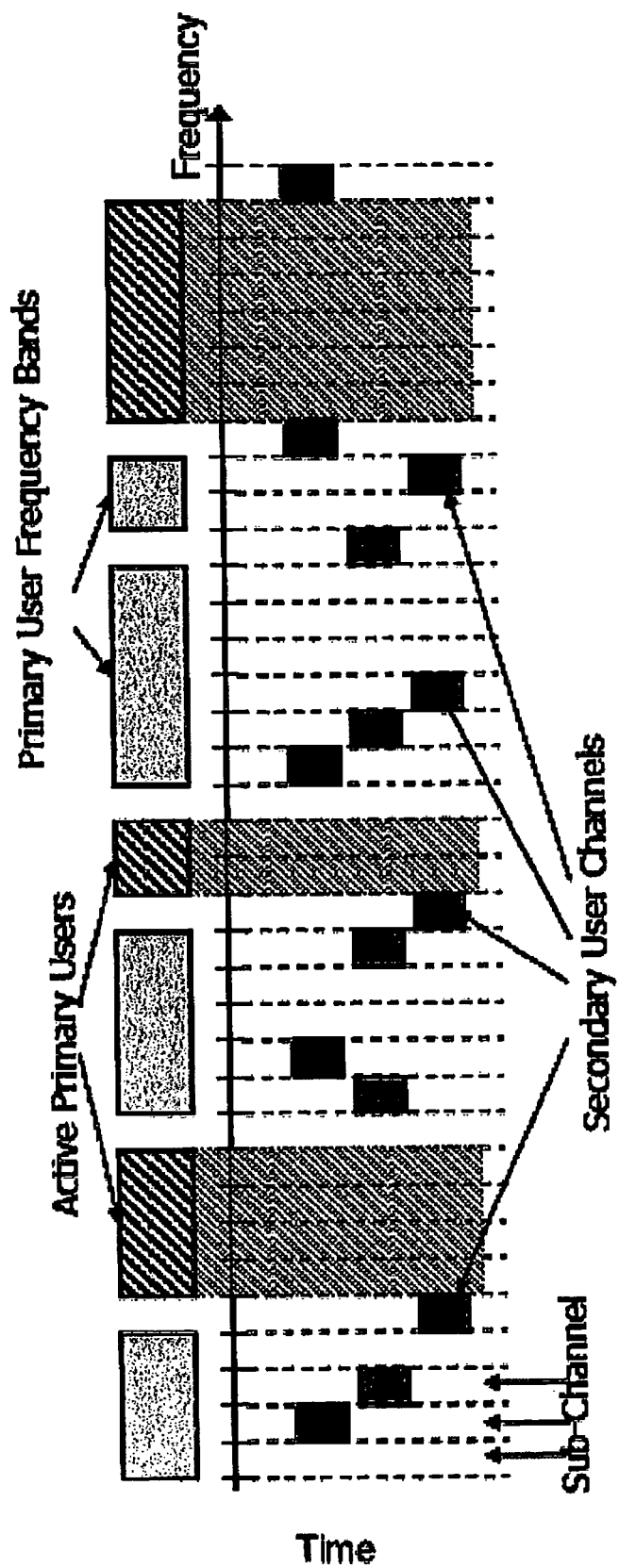
FIG. 3 illustrates a selection of available secondary user channels as well as active and inactive primary user frequency bands and middle bands.

In some examples, primary user frequency bands may be identified. For example, FIG. 3 illustrates a selection of available secondary user channels as well as active and inactive primary user frequency bands and middle bands. The primary user frequency bands may be identified by for example retrieving a primary user frequency map from a network location, or by measuring ambient radio frequencies, and storing appropriate primary user frequency band identification information in a device memory. Available secondary user channels may be then identified by analyzing the primary user frequency bands to determine inactive primary user frequency bands. This may be accomplished for example by scanning the primary user frequency map to determine where the inactive bands are, or by measuring incoming radio signals to determine inactive primary user frequency bands, and storing the inactive band identification information in device memory.

Figure 4:
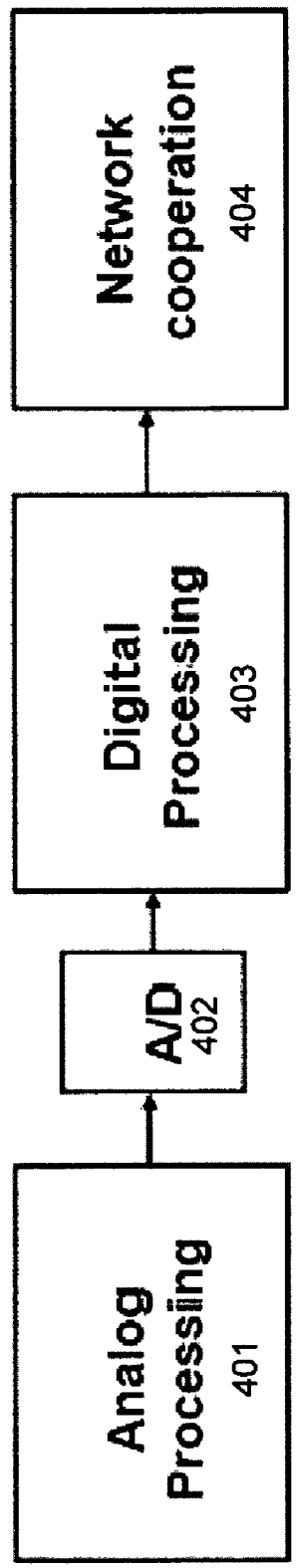
FIG. 4 illustrates an example device and corresponding method employing a network cooperation component and corresponding steps.

Network cooperation may be employed in some embodiments. For example, FIG. 4 illustrates an example device and corresponding method employing a network cooperation component and corresponding steps. The use of a network cooperation component 404 includes several useful advantages. First, discovered unused frequency channels can be communicated to a network by a network communications means such as 980 in FIG. 1D for use in subsequent network communications. Second, network cooperation component 404 can be useful in the discovery process. For example, an initial determination of unused RF channels may be made using analog processing 401, A/D conversion 402, and digital processing 403 components using techniques discussed above with respect to FIGS. 1A, 1B, 1C, 1D, 1E, 1F, 2 and 3. Determinations may be evaluated and compared against history and availability information obtained via network cooperation component 404.

Figure 5:
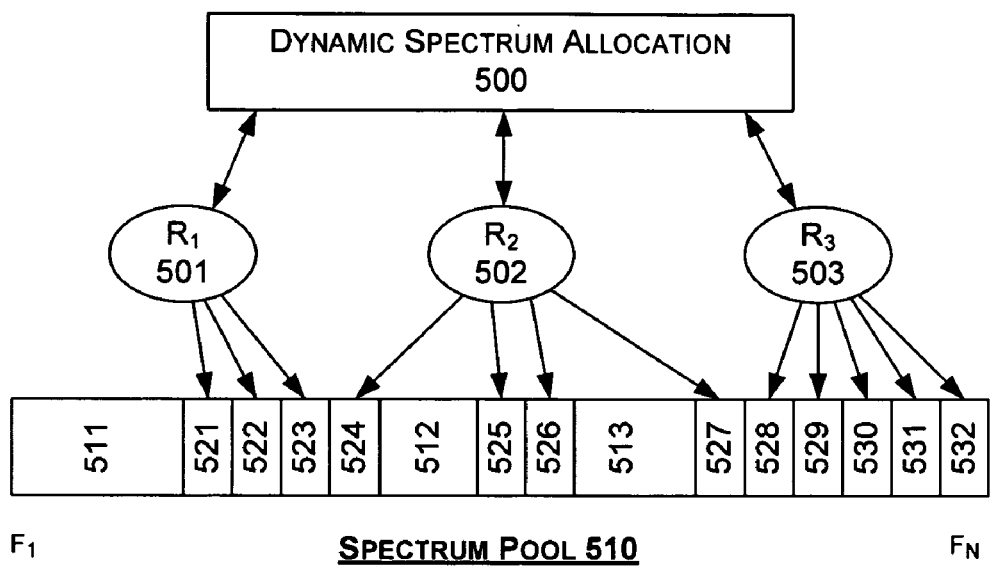
FIG. 5 illustrates dynamic spectrum allocation as may be performed in accordance with disclosed embodiments.

FIG. 5 illustrates dynamic spectrum allocation as may further be performed in accordance with disclosed embodiments. Dynamic spectrum allocation may also include the network cooperation components as illustrated in FIG. 4. For example, a dynamic spectrum allocation component 500 may reside on a network server that is in two-way communication with a plurality of receivers R1 501, R2 502, and R3 503. Receivers 501-503 may or may not be equipped to perform opportunistic RF detection, as disclosed herein. In embodiments where receivers are so equipped, the receivers may be configured to forward available unused RF frequency information, e.g., using a network communications means such as 980 in FIG. 1E, to the dynamic spectrum allocation component 500. Otherwise, dynamic spectrum allocation component 500 may acquire such information from other sources, e.g., from a networked computing device such as 990 in FIG. 1E. For example, spectrum utilization information could be usefully published on the Internet by a private business engaged in gathering and disseminating such information, or by a government agency such as the FCC in the United States.

Unused RF frequency information could be retrieved from servers of the publishing organization.

Component 500 determines based on received availability information that a spectrum pool 510 ranging from frequencies $f_1$ to $f_N$, includes certain unavailable frequency ranges, for example 511, 512, and 513, and certain available frequency ranges, for example 521-532 inclusive. Component 500 next determines which of the available frequency bands 521-532 to assign to the various receivers (R1-R3) 501-503. This determination may be based on needs of particular receivers, location of receivers, and capabilities of receivers. The frequency band assignments are then sent to receivers 501-503.

Receivers 501-503 are equipped to receive and/or transmit communications on frequencies determined by component 500. Thus, where receiver 501 is assigned frequency bands 521, 522, and 523, it may then receive signals on those bands. If receiver 501 is also equipped with a transmitter, it may also transmit on the assigned channels.

Figure 6:
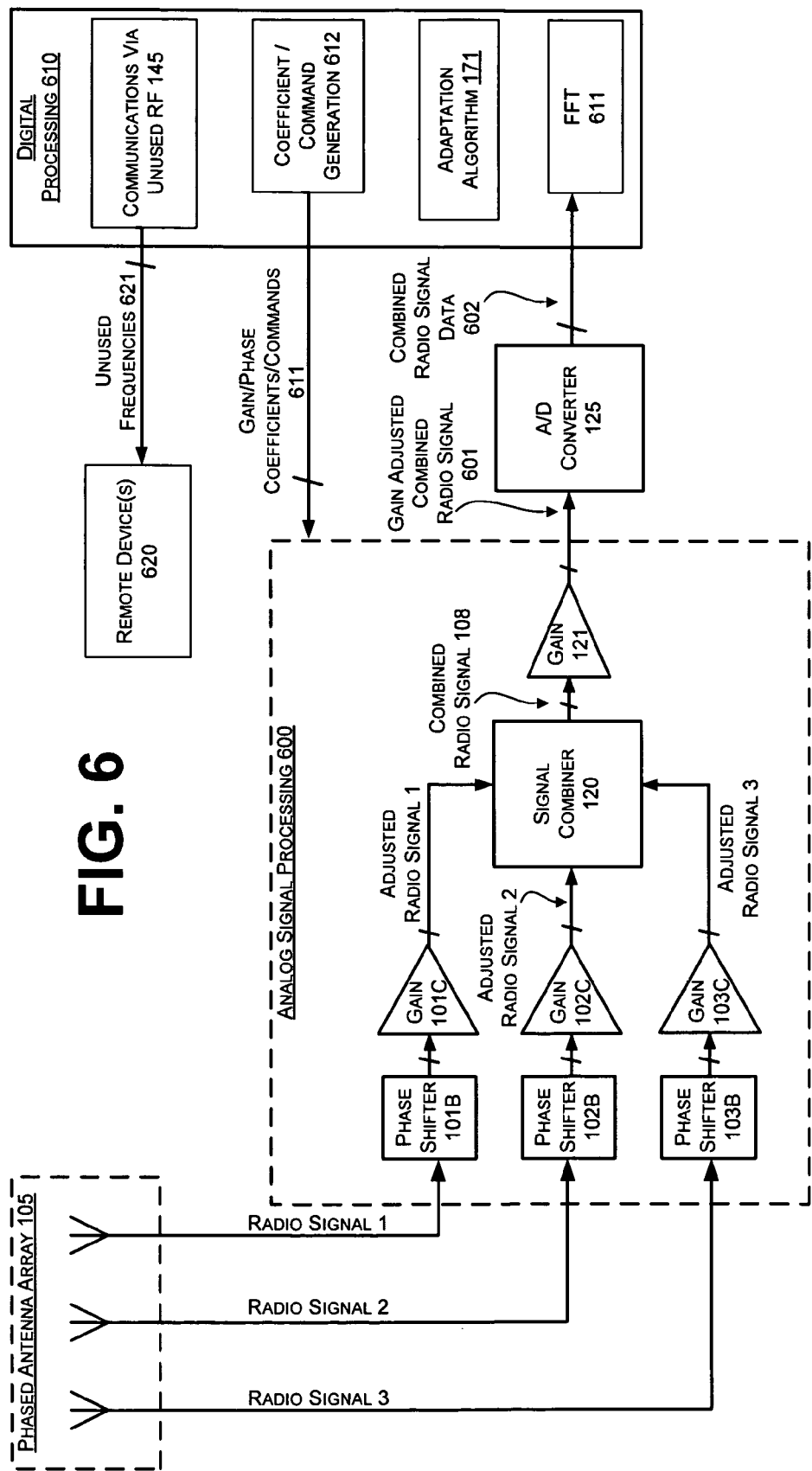
FIG. 6 illustrates an example device configured for opportunistic radio frequency communications.

FIG. 6 illustrates an example device configured for opportunistic radio frequency communications. The device of FIG. 6 is similar to that of FIG. 1A, albeit with several differences. Certain components in FIG. 6 may be the same as those of FIG. 1A as indicated by the use of the same identifiers.

FIG. 6 includes a phased antenna array 105, an analog signal processing block 600, an A/D converter 125, a digital processing block 610, and one or more remote devices 620. The analog signal processing block 600 includes phase shifters 101B, 102B, and 103B; gain units 101C, 102C, and 103C; signal combiner 120; and master gain unit 121. The digital processing block 610 includes FFT component 611, adaptation algorithm 171, coefficient/command generation component 612, and communications via unused RF frequencies component 145.

Each antenna of the phased antenna array 105 is coupled to a corresponding phase shifter 101B-103B. Radio signals 1, 2, and 3 are thereby coupled from array 105 to the phase shifters 101B-103B. Each phase shifter 101B-103B is coupled to a gain unit 101C-103C. Each gain unit 101C-103C is coupled to the signal combiner 120. Adjusted radio signals 1, 2, and 3 are thereby coupled from phase shifters 101B-103B and gain units 101C-103C to signal combiner 120, which produces a combined radio signal 108. The signal combiner 120 is coupled to the master gain unit 121. The combined radio signal 108 may be gain adjusted by the master gain unit 121.

The master gain unit 121 is coupled to the FFT component 611 which may be included in the digital processing block 610. The FFT component 611 produces an output in the memory of the digital processing block (memory not shown in FIG. 6) that may be operated upon by adaptation algorithm 171, coefficient/command generator 612, and communications via unused RF frequencies component 145. The coefficient/command generator 612 may generate and send gain and phase coefficients and/or commands 611 to the analog signal processing block 600, for subsequent adjustment of radio signals 1, 2, and 3. A distance d between various antennas in the array 105 may be used in calculating coefficients by the coefficient/command generator 612.

The communications via unused RF frequencies component 145 may send unused frequency data 621 to remote devices 620 for use in communications. This may be done by transmitting wired or wireless signals to such remote devices 621. If a wireless signal is to be sent, and the digital processing block 610 has control of at least one antenna in the array 105, then such antenna may be utilized for transmitting wireless communications.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A device equipped to reduce a dynamic range of Radio Frequency (RF) signals processed by an Analog to Digital (A/D) converter, comprising:
    an analog processing block configured to receive the radio frequency signals, generate combined radio signals from the radio frequency signals, and couple the combined radio signals to an input of the A/D converter;
    a memory configured to store digital radio signal data output from the A/D converter, wherein the digital radio signal data is representative of the combined radio signals; and
    a processor configured to execute instructions for reducing a dynamic range of radio frequency signals input to the A/D converter, the instructions comprising:
        determining a direction of a strongest radio signal represented in the digital radio signal data; and
        modifying a combination of the radio frequency signals input to the A/D converter by controlling the analog processing block to produce an A/D converter input with a reduced radio signal power from the direction of the strongest radio signal.

2. The device of claim 1, the instructions for modifying comprising computing antenna array coefficients for a phased antenna array, wherein each computed antenna array coefficient is associated with an adjusted gain for radio signals received from a corresponding antenna in the phased antenna array.

3. The device of claim 1, the instructions for modifying comprising computing antenna array coefficients for a phased antenna array, wherein each computed antenna array coefficient is associated with an adjusted phase for radio signals received from a corresponding antenna in the phased antenna array.

4. The device of claim 3, the analog processing block further comprising an analog phase shifter, wherein the analog phase shifter is configured by the processor with the antenna array coefficients to adjust a phase associated with radio signals received from one or more antennas in the phased antenna array.

5. The device of claim 4, the device further comprising the A/D converter, and wherein the A/D converter is configured to convert analog radio signals output from the analog phase shifter to digital radio signal data.

6. The device of claim 5, the device further comprising two or more antennas.

7. The device of claim 1, the instructions for determining a direction applying a Fast Fourier Transform (FFT) on the radio signal data to produce a power profile of the radio signal data.

8. The device of claim 7, the instructions for determining a direction causing the processor to sample a set of directions.

9. The device of claim 8, wherein the instructions for sampling utilize a sample set of antenna array coefficients, the sample set comprising antenna array coefficients for use in analyzing a representative set of directions to determine signal strength in the representative set of directions.

10. A method for reducing a dynamic range of radio signals, comprising:
  receiving radio signals from a phased antenna array, wherein antennas in the phased antenna array are arranged to provide received radio signals;
  combining the received radio signals with an analog signal processing block that is configured to provide combined radio signals;
  evaluating the combined radio signals to determine a direction of a strongest radio signal;
  computing antenna array coefficients responsive to the direction of the strongest radio signal, wherein the computed antenna array coefficients are dynamically adjusted to reduce radio signal power associated with the direction of the strongest radio signal; and
  applying computed antenna array coefficients to the analog signal processing block, wherein the analog signal processing block is arranged to utilize the coefficients to adjust one or more of a signal gain and a signal phase associated with one or more antennas in the phased antenna array.

11. The method of claim 10, further comprising converting the combined radio signal from analog to digital form prior to the evaluating the combined radio signal to determine the direction of the strongest radio signal.

12. The method of claim 11, wherein evaluating the combined radio signal to determine the direction of the strongest radio signal comprises applying a Fast Fourier Transform (FFT) on the digital form of the combined radio signal to produce a power profile of the combined radio signal.

13. The method of claim 12, wherein evaluating the combined radio signal to determine the direction of the strongest radio signal further comprises sampling a set of directions.

14. The method of claim 13, wherein sampling the set of directions includes utilizing a sample set of antenna array coefficients.

15. The method of claim 10, wherein the analog signal processing block comprises an analog phase shifter that is configured to adjust one or more of gains and phases of at least two antennas from the phased antenna array in response to antenna array coefficients received from the processor.

16. A device configured for opportunistic use of radio frequencies, comprising:
  an analog processing block that is arranged to receive a first radio signal and a second radio signal, selectively adjust a signal power level associated with the first radio signal and the second radio signal to provide a first adjusted radio signal and a second adjusted radio signal, and combine the first adjusted radio signal and the second adjusted radio signal to provide combined radio signals;
  an analog to digital converter that is arranged to receive the combined radio signals and convert the combined radio signals into digital data;
  a processor that is arranged to process the digital data;
  a non-transitory computer readable medium comprising instructions executable by the processor, the instructions comprising:
    reducing a dynamic range of the combined radio signals by evaluating the digital data to determine a direction of a strongest radio reception, and adjusting a signal power level associated with one or more of the first adjusted radio signal and the second adjusted radio signal such that each subsequently received radio signal has a radio signal power that is reduced for the determined direction of the strongest radio reception;
    evaluating the digital data to identify an unused radio frequency for the combined radio signal; and
    selecting the unused radio frequency for device communications.

17. The device of claim 16, the analog processing block further comprising a first analog gain block and a second analog gain block that are arranged to selectively adjust a corresponding one of a first gain and a second gain in response to antenna array coefficients received from the processor, wherein the antenna array coefficients are produced by the processor in response to executing the instructions for reducing the dynamic range of the received radio signals, and wherein the first gain is associated with the first adjusted radio signal and the second gain is associated with the second adjusted radio signal.

18. The device of claim 17, the analog processing block further comprising a first analog phase shifter block and a second analog phase shifter block that are arranged to selectively adjust a corresponding one of a first phase and a second phase in response to the antenna array coefficients received from the processor, wherein the first phase is associated with the first adjusted radio signal and the second phase is associated with the second adjusted radio signal.

19. The device of claim 18, the device further comprising a first antenna arranged to receive the first radio signal, and a second antenna arranged to receive the second radio signal.

20. The device of claim 16, the instructions for selecting the unused radio frequency for device communications comprising instructions for transmitting a communication for receipt by one or more remote devices, wherein the communication is arranged such that the remote devices are dynamically configured to utilize the unused radio frequency in response to the communication.

* * * * *

UNITED STATES PATENT AND TRADEMARK OFFICE
CERTIFICATE OF CORRECTION

PATENT NO. : 8,223,889 B2  
APPLICATION NO. : 12/351697  
DATED : July 17, 2012  
INVENTOR(S) : Cabric Page 1 of 1

It is certified that error appears in the above-identified patent and that said Letters Patent is hereby corrected as shown below:

On the Title Page, in Item (56), under "OTHER PUBLICATIONS", in Column 2, Line 8, delete "Gazzette," and insert -- Gazette, --, therefor.

On the Title Page, in Item (56), under "OTHER PUBLICATIONS", in Column 2, Line 11, delete "Gazzette," and insert -- Gazette, --, therefor.

In the Specification

In Column 5, Line 65, delete "w" and insert -- $\omega_c$ --, therefor.

Signed and Sealed this  
Eleventh Day of June, 2013

Teresa Stanek Rea  
*Acting Director of the United States Patent and Trademark Office*